A. B. FIELD & I. L. GRIFFITH.
DYNAMO ELECTRIC MACHINE.
APPLICATION FILED SEPT. 10, 1914.

1,291,459. Patented Jan. 14, 1919.

WITNESSES:
Fred. A. Lind.
O. W. Kennedy.

INVENTOR
Allan B. Field
Israel L. Griffith
BY
ATTORNEY

UNITED STATES PATENT OFFICE.

ALLAN B. FIELD, OF MARPLE, ENGLAND, AND ISRAEL L. GRIFFITH, OF PITTSBURGH, PENNSYLVANIA, ASSIGNORS TO WESTINGHOUSE ELECTRIC AND MANUFACTURING COMPANY, A CORPORATION OF PENNSYLVANIA.

DYNAMO-ELECTRIC MACHINE.

1,291,459.  Specification of Letters Patent.  Patented Jan. 14, 1919.

Application filed September 10, 1914. Serial No. 860,983.

*To all whom it may concern:*

Be it known that we, ALLAN B. FIELD, a subject of the King of Great Britain, and a resident of Marple, in the county of Cheshire, England, and ISRAEL L. GRIFFITH, a citizen of the United States, and a resident of Pittsburgh, in the county of Allegheny and State of Pennsylvania, have invented a new and useful Improvement in Dynamo-Electric Machines, of which the following is a specification.

Our invention relates to ventilating apparatus for dynamo-electric machines provided with multiple-layer armature windings, and it has for its object to provide simple and efficient means for cooling certain parts of alternators and other dynamo-electric machines during the operation thereof.

In the design and construction of dynamo-electric machines of large capacity, it is exceedingly important that adequate ventilation be provided in order to dissipate the heat developed in the current-carrying portions during the operation of such apparatus. Machines provided with multiple-layer armature windings develop particularly high local temperatures within the conductors of the windings, which temperatures limit the rating at which the machines may be operated. By a multiple-layer winding, we mean a winding wherein each slot contains a plurality of conductors or coils arranged in two or more separate layers. Each layer may comprise a conductor or conductors or a portion of a coil or one or more coils, the respective layers being suitably disposed within the slot.

According to our invention, we provide a ventilating space or duct between two layers in each of the armature slots by introducing suitably insulated spacers therein in such relation to the several layers that they are kept separated from each other while, at the same time, they are subjected throughout their lengths to a cooling medium, such as air. Provision is also made for holding the coils firmly in place within the slots by introducing wedges of insulating material adjacent to the open ends of the slots. Further ventilating means is provided by the use of longitudinally disposed ducts in the armature teeth.

Figure 1:
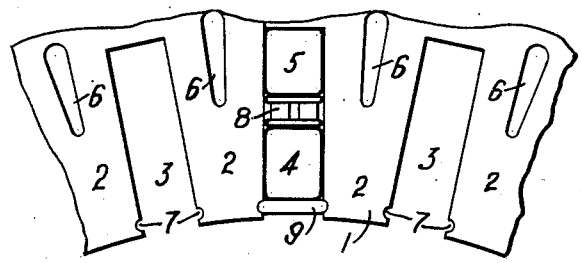
Figure 2:
Figure 3:
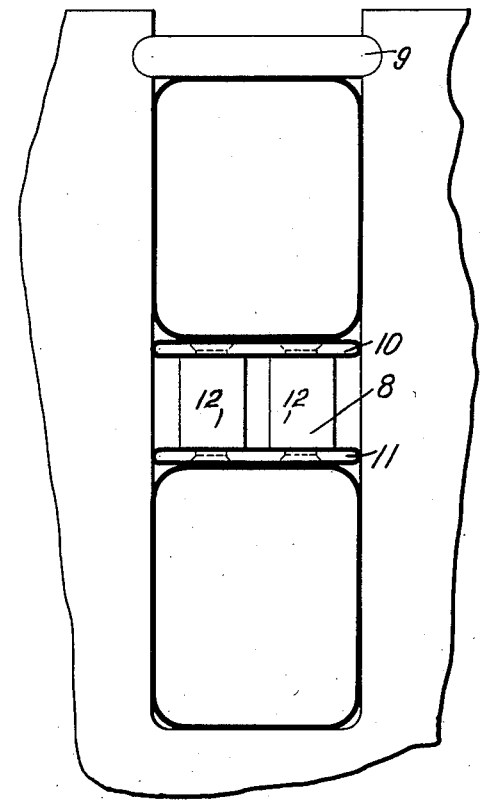
Figure 4:
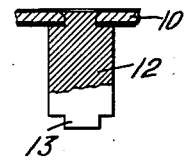

Figure 1 of the accompanying drawing is a sectional view of a portion of a stator of an alternator provided with a two-layer winding; Fig. 2 is a plan view of a spacer introduced between the coils within a slot; Fig. 3 is an enlarged transverse sectional view of the parts contained within a slot, and Fig. 4 is a fragmentary sectional view of some of the parts shown in Fig. 3.

Referring to the drawing, a stator 1, composed of laminations of sheet metal in the ordinary manner, is provided with teeth 2—2 and with slots 3—3 which are of sufficient depth to contain two layers of armature conductors 4 and 5 in spaced relation to each other. The base of each tooth is provided with a longitudinally disposed duct or opening 6. The sides of each slot are provided with oppositely disposed grooves 7, located near the inner periphery of the stator. The layers of conductors 4 adjacent to the open ends of the slots are maintained in spaced relation to the layers 5 at the bottom of the slots by means of the spacers 8. Wedges 9, driven into the grooves 7 serve to retain the conductors within the slots.

The wedges 9 are made of some suitable insulating material, such as hard fiber. The spacer member 8 comprises metal plates 10 and 11 of some conducting material, such as brass, held apart by hard fiber pins 12, shown in Figs. 3 and 4. The pins 12 are cylindrical in form having extremities 13 of reduced diameter. Holes drilled and counter-sunk in the metal plates 10 and 11 are adapted to receive the ends 13 of the pins 12 which are placed in staggered relation to one another throughout the length of the plate, as shown in Fig. 2. The pin 14, at the right hand extremity of the spacer member 8, is composed of the same material as the plates 10 and 11, but is otherwise of the same form as the fiber pins. The outer ends of the pins 12 are upset to form rivet heads, substantially as shown in Fig. 4. This operation serves to retain the extremities of the pins securely within the holes and to firmly hold the plates in spaced relation to each other, thus forming the completed device.

Insulation of the metal plates is provided by wrapping them with several layers of some suitable insulating material, such as fish paper, and cementing the several layers securely to the plate. This insulation is applied after the plates have been drilled, so that it is necessary to provide holes in the insulation coinciding with those in the plates, in order that the ends of the pins may be received within the holes. The spacer is grounded by means of a suitable grounding spring 15 which is composed of some conducting material, preferably phosphor bronze, and is adapted to be retained within a hole drilled in the pin 14, as shown in Fig. 2. The spring bears against one side of the slot when the spacer 8 is inserted within the slot, thus effectively grounding the spacer to the armature core.

It will be readily understood, from the foregoing description and from the drawing, that the conductors are effectively ventilated, since the space between the superposed layers is of relatively large extent in proportion to that taken up by the conductors. The unitary form of the spacers 8 permits them to be located in any portion of the slots without any coaction between spacers and grooves in the sides of the slots. The arrangement of the pins 12 in staggered relation causes the cooling medium passing through each spacer to take an irregular path that is longer than the armature slot, thereby giving a greater cooling effect.

The respective layers need not be in superposed relation to each other, as shown in the drawings, for the spacer would be equally effective if the layers were oppositely disposed within the slot.

While we have shown our invention in its simplest and preferred form, it is not so limited but is capable of various modifications within the scope of the appended claims.

We claim as our invention:

1. An armature of a dynamo-electric machine provided with a plurality of slots, a plurality of layers of current-carrying conductors lying in said slots, and spacing means between said layers comprising insulated metallic plates spaced apart by pins of insulating material.

2. An armature of a dynamo-electric machine provided with a plurality of slots, a plurality of layers of current-carrying conductors lying in said slots, and spacing means between said layers comprising insulated metallic plates spaced apart by pins of insulating material and means whereby said plates are grounded to the armature core.

3. An armature of a dynamo-electric machine provided with a plurality of slots, a plurality of layers of current-carrying conductors lying in said slots, and spacing means between said layers comprising insulated metallic plates spaced apart by a plurality of pins of insulating material and electrically connected but mechanically spaced apart by a pin of conducting material and means whereby said pin is electrically connected to the armature core.

4. An armature of a dynamo-electric machine provided with a plurality of slots, a plurality of layers of current-carrying conductors lying in said slots, and spacing means between said layers comprising insulated steel plates spaced apart by a plurality of pins of insulating material and electrically connected but mechanically spaced apart by a pin of conducting material and a spring member mounted on said pin and engaging the side of said slot to ground the said metal plates to the armature core.

5. An armature of a dynamo-electric machine provided with a plurality of slots, a plurality of layers of current-carrying conductors lying in said slots and spacing means between said layers providing an irregular passage for a cooling medium therebetween, the said means comprising spacers composed of insulated metal plates held in spaced relation to one another by fiber pins arranged in staggered relation between the plates for supporting certain of the said layers above the remaining layers.

In testimony whereof, I have hereunto subscribed my name this 11th day of August 1914.

ALLAN B. FIELD.

Witnesses:
NORMAN H. SHEARD,
JAS. STEWART PROUDFOOT.

In testimony whereof, I have hereunto subscribed my name this 31st day of August, 1914.

ISRAEL L. GRIFFITH.

Witnesses:
L. C. McLURE,
B. B. HINES.